Oct. 4, 1932.     H. A. DICKINSON     1,880,878
CUTTING TOOL HEAD
Filed Sept. 17, 1928      4 Sheets-Sheet 1

Inventor
Henry A. Dickinson
By Arthur F. Durand
Atty.

Oct. 4, 1932.    H. A. DICKINSON    1,880,878
CUTTING TOOL HEAD
Filed Sept. 17, 1928    4 Sheets-Sheet 2
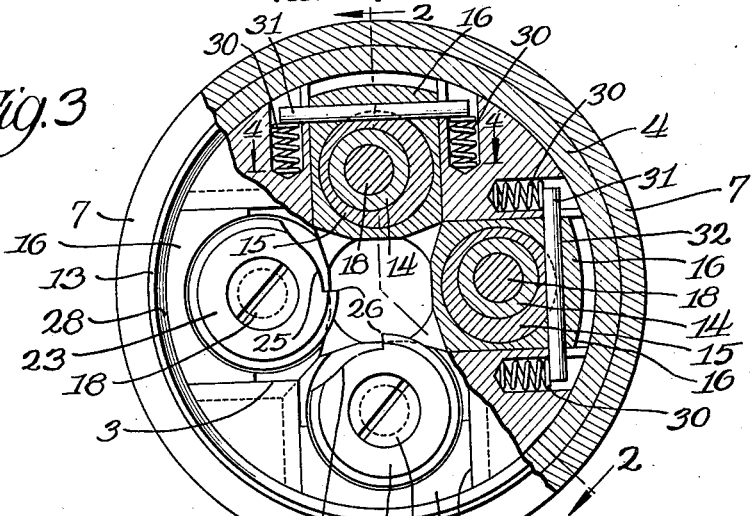
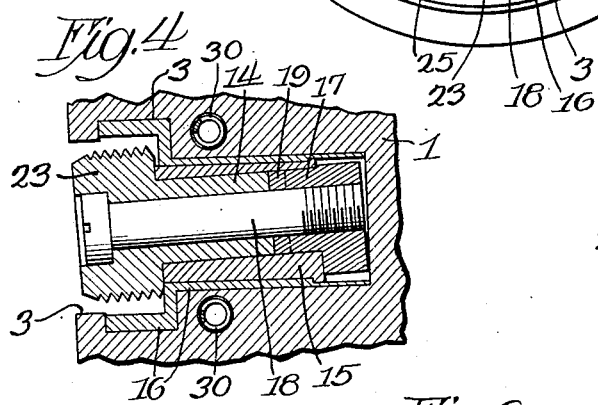
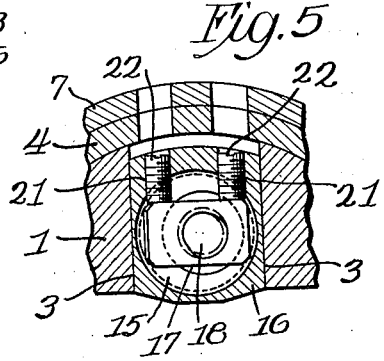
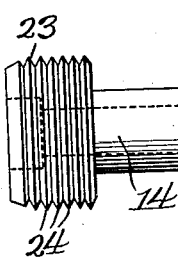
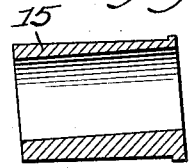
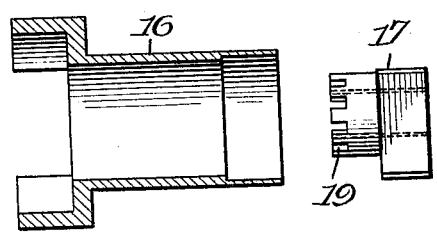
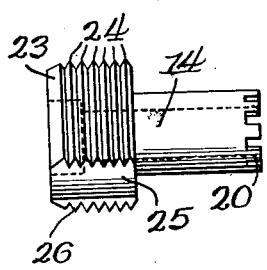
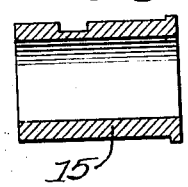
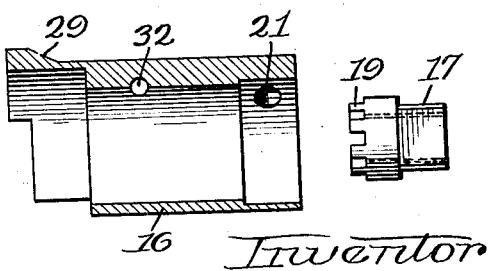
Inventor
Henry A. Dickinson
By Arthur F. Durand
Atty.

Oct. 4, 1932.   H. A. DICKINSON   1,880,878
CUTTING TOOL HEAD
Filed Sept. 17, 1928   4 Sheets-Sheet 3

Inventor
Henry A. Dickinson
By Arthur H. Durand
Atty.

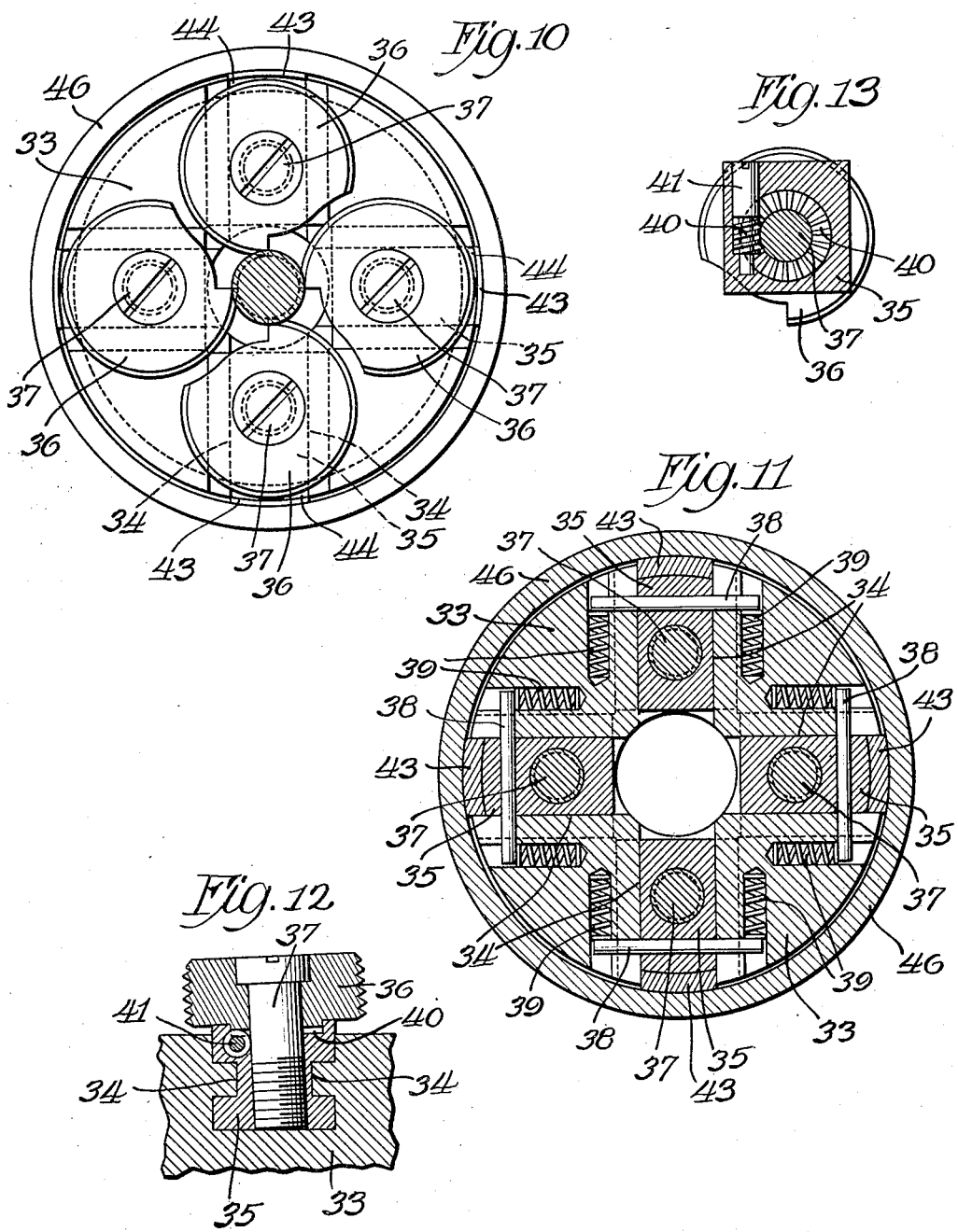

Patented Oct. 4, 1932

1,880,878

UNITED STATES PATENT OFFICE

HENRY A. DICKINSON, OF RIVERSIDE, ILLINOIS, ASSIGNOR TO CYRUS M. BOSWORTH, OF RIVERSIDE, ILLINOIS

CUTTING TOOL HEAD

Application filed September 17, 1928. Serial No. 306,536.

This invention relates to devices for cutting metal stock, by relative rotation between the stock and the cutting head, and more specifically for cutting screw threads on rods or pipes.

Generally stated, the object of the invention is to provide a novel, improved device of this character which will accurately cut the metal stock, as by cutting screw threads on a rod or pipe, which is comparatively inexpensive to manufacture or produce, in which cutters or chasers are provided which can be resharpened many times, and in which means are provided for insuring accurate adjustment of the cutters.

It is also an object to provide a novel and improved construction whereby certain features of construction heretofore considered necessary or desirable are eliminated, and not used, thereby insuring better action of the cutters or chasers, and more accurately formed surfaces for insuring accurate cutting adjustment of the cutters or chasers, and a more accurate cutting action of the chasers in the operation of cutting a piece of metal, or of forming a screw thread on a rod or pipe.

It is also an object to provide certain details and features of construction and combinations tending to insure more satisfactory results in a thread-cutting device of this particular character.

To the foregoing and other useful ends, the invention consists in matters hereinafter set forth and claimed and shown in the accompanying drawings, in which—

Figure 3 is a front elevation of the device shown in Figure 1, with certain portions thereof shown in transverse section on line 3, 3, in Figure 2;

Figure 4 is a horizontal detail section on line 4, 4, in Figure 3;

Figure 5 is a fragmentary detail section on line 5, 5, in Figure 2;

Figure 6 is a more or less diagrammatic view showing the parts of one of the cutters separated, with two of the parts thereof in horizontal section;

Figure 7 is a similar view, but with the said two parts shown in vertical section;

Figure 10 is an end elevation of the device shown in Figure 8 of the drawings;

Figure 11 is a transverse section on line 11, 11, in Figure 9;

Figure 12 is a detail or fragmentary horizontal section on line 12, 12, in Figure 9;

Figure 13 is a detail vertical section on line 13, 13, in Figure 9.

Figure 1:
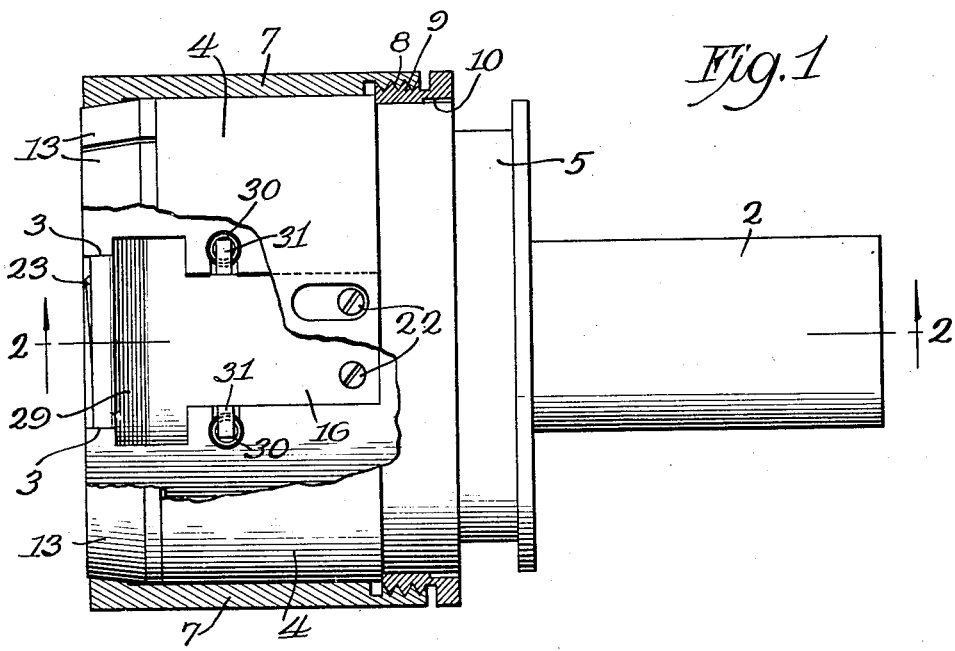
Figure 1 is a side elevation of a thread-cutting device embodying the principles of the invention, with certain outer portions hereof shown in section, and with certain portions broken away for convenience of illustration.
Figure 2:
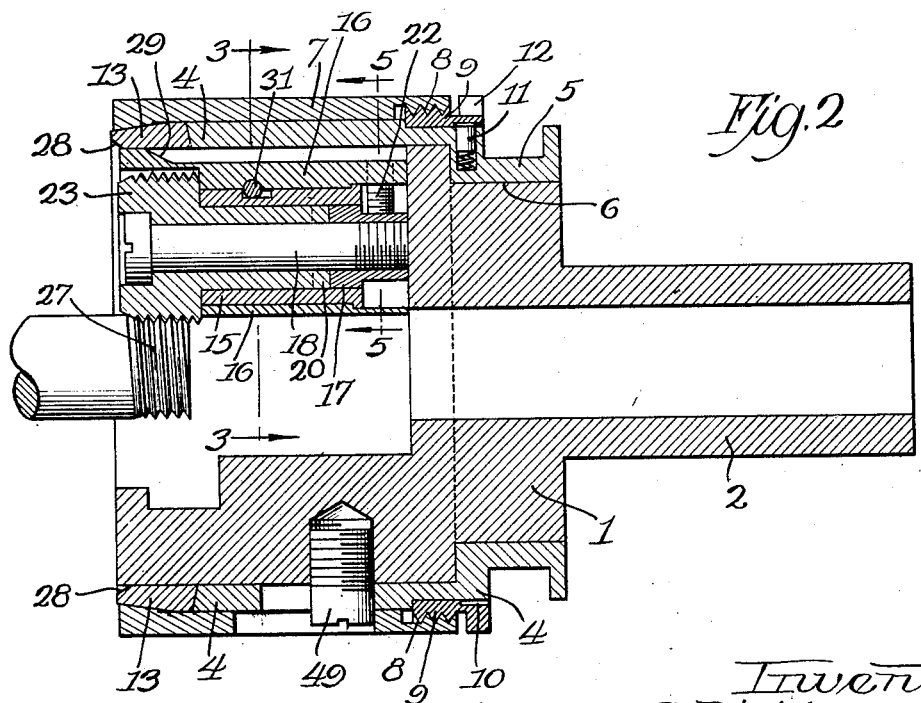
Figure 2 is a longitudinal section on line 2, 2, in Figure 1.

Referring to Figures 1 to 7 inclusive, the invention comprises a body member 1 having a tubular and axial extension 2, said member being hollow and having four radial guideways 3 formed therein as shown. A cylindrical collar 4 is provided, having a reduced portion 5 that fits on the annular shoulder 6 of the member 1, as shown. A cylindrical outer collar 7 is provided, and this collar 7 has threaded engagement at 8 with the threaded ring 9, which latter engages the collar 4, previously mentioned. The ring 9 is provided internally with teeth 10 for engagement with the spring-pressed engaging element 11, suitably mounted in the collar 4, as shown, and the ring 9 has a notch 12 whereby it can be rotated forcibly to cause the element 11 to engage any portion of the inner toothed periphery of the ring 9, when the latter is rotated, thereby to draw the outer collar 7 into tight engagement with the inner split ring 13, which latter is thereby held tightly against the end of the collar 4, previously mentioned. When the split beveled ring 13 is contracted, it moves to the left, but when it is allowed to expand it moves to the right. There is a cutter for each of the radial guides 3, and each cutter comprises the cutter proper 14, its excentric sleeve 15, the outer carrier sleeve 16 formed to directly engage the sides of the guide recesses 3, previously mentioned, and the retainer 17, these four parts being shown in Figures 6 and 7 of the drawings, together with a retaining bolt 18 extending axially of the parts 14, 15, 16 and 17, as shown in Figures 2 and 4 of the drawings. The axes of the retaining bolts 18, it will be seen, are disposed in planes that are all parallel with the longitudinal axis of the rotary member 1, but each bolt 18 is skewed slightly in its plane, as shown in Figure 4 of the drawings. Each bolt 18 is threaded to screw into the threaded socket of the part 17, and the latter has teeth 19 at its inner end to engage the teeth 20 on the part 14, whereby the part 17 holds the part 14 against rotation during the operation of the device. Adjusting screws 21 are threaded in openings 22 in each carrier 16, to engage the outer side of the transverse end portion 23 of the part 17, whereby the part 17 and the part 14 may be adjusted rotatably, about the axis of the bolt 18, for the purpose of accurately adjusting the cutters. Each cutter proper comprises the chaser 23 of the part 14, this chaser having parallel annular teeth 24 formed thereon, but one side of this chaser being omitted or mutilated at 25 to provide the sharp cutting corners 26 of the cutting heads, which cutting corners cut the threads 27 on the pipe or rod during the operation of the device. Looking at Figure 4 of the drawings, it will be seen that the cutters 23 are skewed at the same angle as the threads 27, and in this way screw threads are cut on a rod or pipe by means of cutters that do not have spiral or oblique teeth or grooves, but, to the contrary, simply have annular teeth and grooves formed on circles struck from the axis of the cutter member 14, it being observed that each annular tooth or cutting edge 24 is formed on such a circle.

In use, the device thus shown and described is rotated by having power applied to the portion 2 while the parts are in the position shown in Figure 2 of the drawings. When the thread is cut on the pipe or rod, the collar 4 is shifted axially to the right, looking at Figures 1 and 2 of the drawings, by any suitable or desired means (not shown) applied to the portion 5, and this causes the ring 13 to move far enough to cause its bevel 28 to engage the bevel 29 on the part or member 16, thus permitting the springs 30 to move all of the cutters radially away from the pipe or rod, thus releasing the latter. These springs 30 engage the ends of pins or rods 31 inserted through the holes 32 formed in the parts or members 16 of the cutter assemblies or units. Then, when another pipe or rod is placed in position to be engaged, the collar or sleeve 4 is then moved to the left, looking at Figures 1 and 2 of the drawings, and the bevels 28 and 29 then cooperate to force the cutters inward toward the pipe or rod and into cutting engagement therewith. By unscrewing the ring 9, the ring 13 can be released, and by removing the collar or sleeve 4 entirely, the cutter units or assemblies can be moved radially from the body member 1 in a manner that will be readily understood. When the cutting corners 26 become dull, they can be cut back a distance, to form new or fresh sharp corners, by using a suitable instrument or tool, and this can be done many times until the annular teeth or edges 24 are entirely used up, and inasmuch as these edges 24 are formed on the lines of two circles struck from the axis of the cutter head, it follows that such renewal of the cutting corners, from time to time, and such diminution of the cutter mass, does not affect the shape or character of the cutter head, so far as the actual cutting is concerned, but, to the contrary, each time leaves the cutter with a set of cutting corners exactly like the previous ones.

In Figures 8 to 13, inclusive, the construction is similar to that previously described, and the general principles are substantially the same, but the specific construction is somewhat different. In this case, the rotatable body member 33 is provided with radial guide recesses 34 in which carrier blocks 35 are mounted and arranged for radial movement. These carrier blocks carry the cutters 36, which are similar to those previously described, and these cutters are held on the blocks 35 by the bolts 37, which latter are screw-threaded to engage the screw-threaded sockets of the blocks 35 in a manner which will be readily understood. The blocks 35 have cross pins 38 engaged by the springs 39, which springs have the same function as the springs 30, previously described. Each cutter 36 is adjustably locked to its carrier block 35 by the adjustable bevel worm gear device 40, shown in Figure 13 of the drawings. By rotating the worm member 41 of this device, the cutter 36 can be adjusted rotatably relative to its block 35, in a manner to accurately adjust the cutter or chaser and thereby insure accuracy of cutting of the screw threads on the rod or pipe. The sleeve member 42, which is the equivalent of the collar or sleeve member 4, previously mentioned, has four arms 43, each arm being provided at its end with a bevel 44 for engagement with the bevel 45 on the blocks 35, which bevels have the same function and purpose as the bevels 28 and 29, previously described. The arms 43 are somewhat flexible and can be sprung inwardly to insure effective cooperation of said arms with the blocks 35, by screw adjustment of the outer sleeve or collar 46, which latter is locked in adjusted position by the screw ring 47, both being screwed upon the member 42, previously mentioned, which member 42 is axially adjustable on the reduced portion 48 of the member 33 in a manner similar to the axial adjustment of the member 4, previously described.

Figure 9:
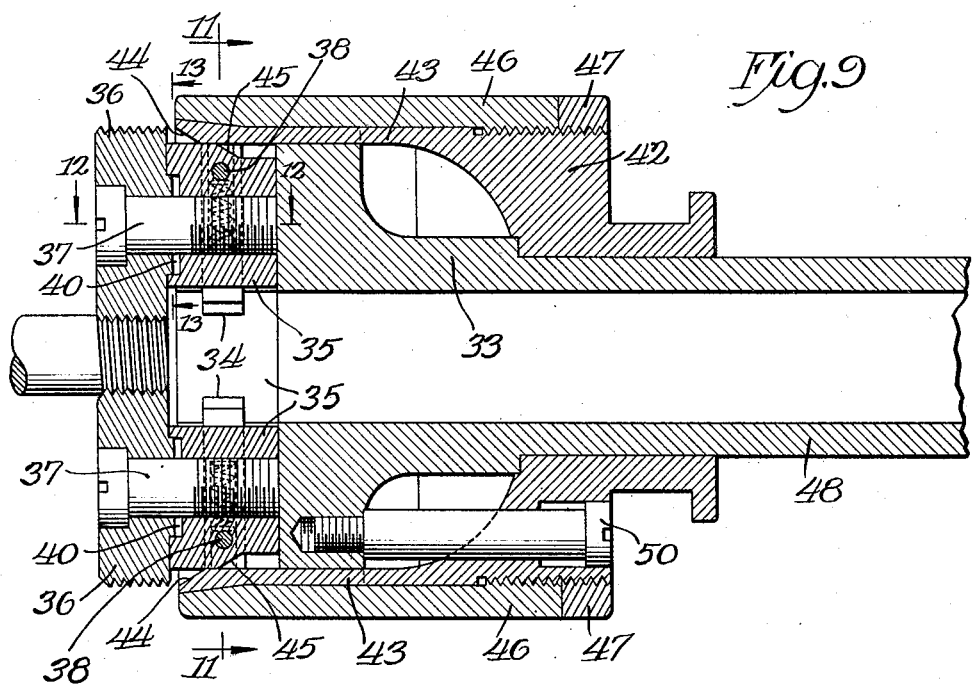
Figure 9 is a longitudinal section on line 9, 9, in Figure 8.

In Figure 2, a radial screw 49 is inserted, as shown, to lock the parts 1, 4 and 7 against relative rotation, this screw being removable to permit the taking of the device apart. In Figure 9, however, a longitudinal screw 50 is inserted through the parts 33 and 42 to prevent relative rotation between these parts, but this screw being loose in the part 42 to permit the latter to have axial movement, as described.

Figure 8:
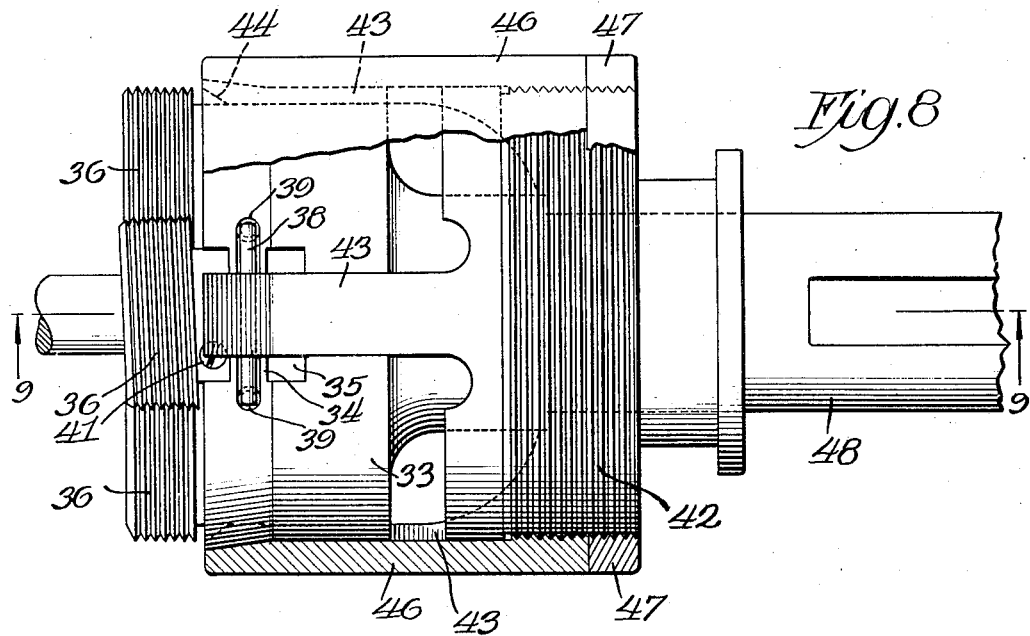
Figure 8 is a view similar to Figure 1, showing a different form of the invention.

Thus, in each form of the invention, the cutters are renewable, from time to time, by sharpening, but such sharpening and renewal does not shift the cutting corners axially of the cutter, but leaves them each time in the same position axially of the cutter. This is because the annular teeth or edges of each cutter are formed on circles struck from the axis of the cutter, it will be seen, and with this arrangement the axis of each cutter is in a plane parallel with the longitudinal axis of rotation of the entire device, but each cutter axis is skewed slightly in its plane, whereby each cutter head is disposed at substantially the same angle as the screw threads cut on the pipe or rod, as shown in Figures 4 and 8 of the drawings. The cutters are also easily adjusted to insure accurate cutting of the screw threads on the pipe or rod, in the manner shown and described. The said cutters, for whatever use or kind of cutting action, form chasers that follow each other around the pipe or rod, or other kind of metal stock.

Thus in each form of the invention the radial adjustment of the cutters or chasers is effected by axial movement or adjustment of the parts, rather than by any relative rotation of the outer parts. In Figures 1 and 2 the axial adjustment of the cylindrical outer part 7 is sufficient to contract or expand the split ring 13, thereby to move the chasers toward or away from the longitudinal axis of the head. In Figures 8 and 9 the axial adjustment of the outer part 46 is sufficient to bend the parts 43 one way or the other, thereby to move the chasers toward or away from the longitudinal axis of the head. Of course, the part 46 must be rotated, in order to obtain this axial adjustment thereof, but it is not the rotation that causes the desired adjustment, for it is obvious that the part 46 will be operative with only axial movement thereof, just as the part 7 in Figures 1 and 2 is operative for that same purpose without any rotation thereof. The surfaces on the parts 7 and 13 are easy to form, and are easily made accurate, and this is also true of the surfaces on the parts 46 and 43, as well as the bevels 29 and 45, and hence accurate adjustment of the chasers is insured. It will be understood, of course, that the head may be rotated, and that the pipe or rod can be held against rotation; or both the head and the pipe or rod may have rotation; or the head may be held against rotation and only the pipe or rod rotated; but in any event the head is relatively rotary, as regardless of which method is employed the head or body carrying the chasers has relative rotation, as in either case there is relative rotation between the head and the pipe or rod. Furthermore, in one form of the invention, the cutting edges of the chasers are directly in line radially with the outer backing or support afforded for the carrier of each chaser, so that there is no tendency toward tilting or canting of the chasers when in action. In Figure 2, for example, the outward thrust of each carrier 16 is sustained by the split ring 13, and the point of thrust on the ring 13 is directly in line with the cutting edge of the chaser. The chasers shown and described are illustrative of certain features of the invention, but it will be understood that other features, as for example the parts 7, 13, and 16 in Figure 2, or the parts 35, 43, and 46 in Figure 9, and other features, can be used in combination with chasers or cutters of any suitable known or approved form, for cutting metal in the desired manner.

In each form of the invention, it will be seen, flexible and resilient means are provided, and means are provided for distorting the flexible and resilient means, thereby to produce or cause accurate adjustment of the chasers. In Figures 1 and 2 such flexible and resilient means is the split ring 13, being made of flexible and resilient steel for this purpose; and in Figure 8 and Figure 9 the flexible and resilient means are the fingers or arms 43, which latter are made of flexible and resilient steel of suitable character for this purpose. In Figure 2 the ring 13 is distorted by the outer sleeve 7 to cause accurate adjustment of the chasers, while in Figure 9 the fingers or arms 43 are distorted or adjusted by the outer sleeve 46 to cause accurate adjustment of the chasers. In each case, therefore, the chasers have radial movement to grip or release a pipe or rod, and in each case flexible and resilient means are provided, in combination with means for distortion thereof, for the purpose of accurately adjusting the chasers, and in each form of the invention it is the axial movement or adjustment of an outer beveled sleeve that causes the distortion of the flexible and resilient means, and by distortion is meant flexing or bending of such means, as occurs when the ring 13 is expanded or contracted, or as occurs when the fingers or arms 43 are bent toward or away from the longitudinal axis of the tool head or device in its entirety.

Without disclaiming anything, and without prejudice to any novelty disclosed, what I claim as my invention is:

1. In a device of the class described, the combination of cutters suitably mounted on a relatively rotary body, forming chasers to follow each other around a pipe or rod, each chaser having an axis disposed in a plane parallel with the axis of said body, but each chaser axis being skewed or angularly disposed in its allotted plane, and means encircling said chasers and movable axially of said body to cause said chasers to move radially toward and away from each other, said encircling means having flexible means susceptible of distortion to vary the range of said radial movement of the chasers, and being axially and rotatively adjustable to cause said distortion.

2. A thread-cutting device as specified in claim 1, subject to control by said axial movement, each chaser having annular teeth or edges mutilated at one side of the cutter to provide cutting corners which can be sharpened and renewed from time to time, said teeth or edges being formed on circles struck from the angular axis of the cutter.

3. A screw thread cutting device as specified in claim 1, said radial movement of the cutters maintaining said chaser axis planes parallel with the said axis of said body.

4. A screw thread cutting device as specified in claim 1, comprising means subject to control by said flexible means and adapted for adjusting each cutter rotatably about its angular axis, and for maintaining the cutter in adjusted position.

5. A screw thread cutting device as specified in claim 1, comprising springs cooperating to cause said chasers to have said radial movement away from the pipe or rod, subject to compression by said axial movement.

6. In a device of the class described, the combination of chasers, and instrumentalities having structural flexibility and operative flexibly and by adjustment thereof axially of said device to adjust the chasers toward or away from said axis, said instrumentalities comprising an outer sleeve having a bevel on the inner surface thereof, and including flexible and resilient means beveled to engage said first mentioned bevel, said outer sleeve having said axial movement.

7. In a device of the class described, the combination of chasers, and instrumentalities having structural flexibility and operative flexibly and by adjustment thereof axially of said device to adjust the chasers toward or away from said axis, said instrumentalities comprising an outer sleeve formed with an inner bevel, and including flexible and resilient means for engagement with said bevel, thereby to hold the chasers in any adjusted position, and including chaser carriers each provided with a bevel, said flexible and resilient means being beveled to engage the bevel of each carrier, and said outer sleeve having said axial movement.

8. In a device of the class described, the combination of chasers, and instrumentalities having structural flexibility and operative flexibly and by adjustment thereof axially of said device to adjust the chasers toward or away from said axis, said instrumentalities comprising an outer sleeve formed with an inner bevel, and including flexible and resilient means for engagement with said bevel, thereby to hold the chasers in any adjusted position, and including chaser carriers each provided with a bevel, said flexible and resilient means being beveled to engage the bevel of each carrier, said outer sleeve having said axial movement, and said instrumentalities including screw threads on said outer sleeve, and means engaging said screw threads to cause said axial adjustment.

9. In a device of the class described, the combination of chasers, a carrier for each chaser, means whereby each carrier has outward and inward radial movement, flexible and resilient means for engaging said carriers to cause said radial movement, to hold the carriers in any adjustable position, means having axial movement to engage and thereby cause flexing or distortion of said flexible and resilient means, from the normal shape of the latter, thereby to cause said inward radial movement, and means for moving said chasers outward when said resilient means is relieved of said distortion thereof.

10. A structure as specified in claim 9, said flexible and resilient means having axial movement to cause said radial movement.

11. A structure as specified in claim 9, said flexible and resilient means being beveled, and said carriers being beveled to engage the bevel on the flexible and resilient means, whereby the latter serves to hold the chasers in any adjusted position.

12. In a device of the class described, the combination of chasers, and means whereby said chasers have radial movement to grip or release a pipe or rod, said means including a flexible and resilient element and adjustable means for engaging and thereby causing distortion of said element for the purpose of accurately adjusting said chasers toward each other, and means for moving the chasers away from each other when said element is relieved of its distortion.

13. A structure as specified in claim 12, said flexible and resilient means being beveled, and said distortion-causing means being beveled to engage the bevel of said flexible and resilient means, whereby the latter serves to hold the chasers in any adjusted position.

Specification signed this 11th day of September, 1928.

HENRY A. DICKINSON.